United States Patent
Gerber et al.

(10) Patent No.: US 6,206,779 B1
(45) Date of Patent: Mar. 27, 2001

(54) GRAIN TANK EXTENSION

(75) Inventors: Edwin Milton Gerber, Hooppole, IL (US); Russell Andrew Huesmann, Jr., Bettendorf, IA (US); Todd Neil Signer; Mark Charles DePoorter, both of East Moline, IL (US); Darryl Francis Cain, Moline, IL (US); Bruno Dauenhauer, Rieschweiler (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/322,452

(22) Filed: May 28, 1999

(51) Int. Cl.[7] .................... A01D 90/10; A01F 12/60
(52) U.S. Cl. .................... 460/23; 460/119; 414/502; 56/28
(58) Field of Search .................... 460/119, 901, 460/902, 903, 23; 414/502, 505; 56/28, DIG. 9; 111/24, 63, 74, 75, 925, 200

(56) References Cited

U.S. PATENT DOCUMENTS

| | | | |
|---|---|---|---|
| 3,771,531 | * 11/1973 | Scribner | 130/30 H |
| 3,888,390 | * 6/1975 | Grau | 222/28 |
| 3,997,089 | * 12/1976 | Clarke et al. | 222/545 |
| 4,106,649 | 8/1978 | Nelson et al. . | |
| 4,138,163 | * 2/1979 | Calvert et al. | 302/52 |
| 4,261,520 | * 4/1981 | Hetrick | 239/657 |
| 4,466,549 | 8/1984 | Hanaway . | |
| 4,779,751 | * 10/1988 | Munroe | 217/69 |
| 4,887,874 | * 12/1989 | Joffe | 312/258 |
| 4,960,300 | 10/1990 | Burvee . | |
| 4,966,310 | * 10/1990 | Hawkins | 222/105 |
| 5,009,939 | * 4/1991 | Goldberg | 428/34.2 |
| 5,151,064 | 9/1992 | Damman et al. . | |
| 5,224,635 | * 7/1993 | Wise | 222/608 |
| 5,427,572 | * 6/1995 | Deutsch et al. | 460/119 |
| 5,452,847 | * 9/1995 | Harris et al. | 229/125.11 |
| 5,475,972 | * 12/1995 | McConnell et al. | 56/28 |
| 5,615,797 | * 4/1997 | Ripamonti | 220/529 |
| 5,638,988 | * 6/1997 | Rogers et al. | 222/81 |
| 6,074,298 | * 6/1998 | Majkrzak et al. | 460/119 |

* cited by examiner

Primary Examiner—Robert E. Pezzuto
Assistant Examiner—Arpad Fabian Kovacs

(57) ABSTRACT

A grain tank extension having side panels that are rotatably mounted to the grain tank to lower the extension by pivoting the side panels into the tank for storage. Corner panels are provided between adjacent side panels and are integrally formed with the stud at each end for coupling the corner panels to the side panels. Flanges extend beyond the ends of the side panels and overlap abutting ends of adjacent corner panels. The flanges each have an aperture that receives the stud from the adjacent corner panel. The stud is held therein by a retaining pin to avoid the need for hand tools to lower the extension for storage. The corner panels are molded of plastic as a single piece plastic body with the studs integrally formed therein.

12 Claims, 6 Drawing Sheets

GRAIN TANK EXTENSION

BACKGROUND OF THE INVENTION

1. Field of the Invention

The present invention relates to a grain tank extension for an agricultural combine and in particular to an extension having molded plastic corner panels with integrally formed studs at each end of the corner panels. The studs are used for attaching the corner panels to adjacent side panels with retaining pins so that the extension can be assembled and disassembled without the use of hand tools.

2. Description of the Related Art

It is a common practice to equip a combine grain tank with an extension to increase the holding capacity of the tank. The tank extension typically forms the highest part of the combine. To facilitate storage of the combine, the extension is made to be removed or lowered into the grain tank. This reduces the height of the combine so the combine may fit through a smaller doorway for inside storage of the combine during the off season. Many grain tank extensions are manufactured of steel with either solid or perforated sheet panels that are bolted to the upper end of the grain tank and are bolted to one another with a multitude of bolts. The result is numerous nut and bolt fasteners that must be removed to disassemble the extension for storage. Other extensions are made of wooden panels or canvas fabric supported on a steel frame. These extensions also have numerous nut and bolts fasteners.

SUMMARY OF THE INVENTION

Accordingly, it is an object of the present invention to provide a grain tank extension that is easily disassembled for storage of the extension in the grain tank of the combine.

It is a feature of the present invention that the grain tank extension is formed with straight side panels and uniquely shaped corner panels with the corner panels molded of plastic to be lightweight and easy to handle.

It is a feature of the present invention that the corner panels have projecting studs at each end that are inserted into apertures at the ends of adjacent side panels. The studs are held in the apertures by retaining pins to couple the side panels and corner panels to one another without the use of hand tools.

In a preferred embodiment, the side panels are rotatably mounted to the grain tank to pivot into the tank for storage. The corner panels each have downwardly extending posts that seat into pockets at the corners of the grain tank. The corner panels are removed by lifting the posts from the pockets. The corner panels are placed inside the grain tank for storage.

The corner panels are integrally formed with the stud at each end for coupling the corner panels to the side panels. The corner panels are formed with a double wall structure having a hollow interior. The hollow interior can be filled with rigid foam for added strength if desired. Flanges extend beyond the side panels and overlap abutting ends of adjacent corner panels. The flanges each have an aperture that receives the stud from the adjacent corner panel. The stud is held therein by a retaining pin to avoid the need for hand tools when lowering the extension for storage.

The overlapping flange at the ends of the side panels is shaped with a groove extending along the side panel end. Each corner panel in turned is formed with a raised rib that seats within the groove in the adjacent side panel flange. The overlapping flange and the rib and groove cooperate to form a circuitous path to resist leakage of grain between the corner and side panels.

DESCRIPTION OF THE PREFERRED EMBODIMENT

Figure 1:
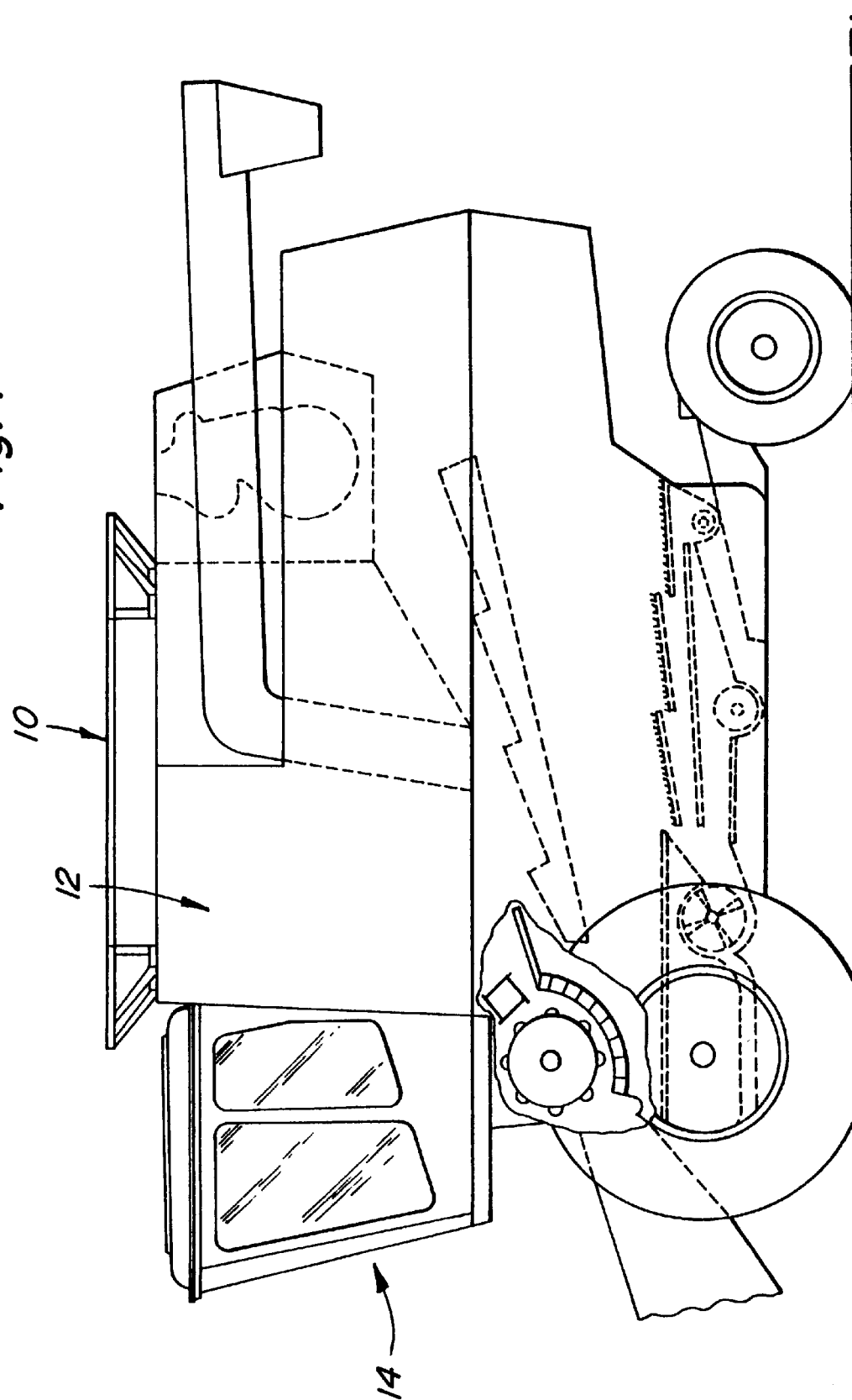
FIG. 1 is a side view of a combine with the grain tank extension of the present invention.
Figure 2:
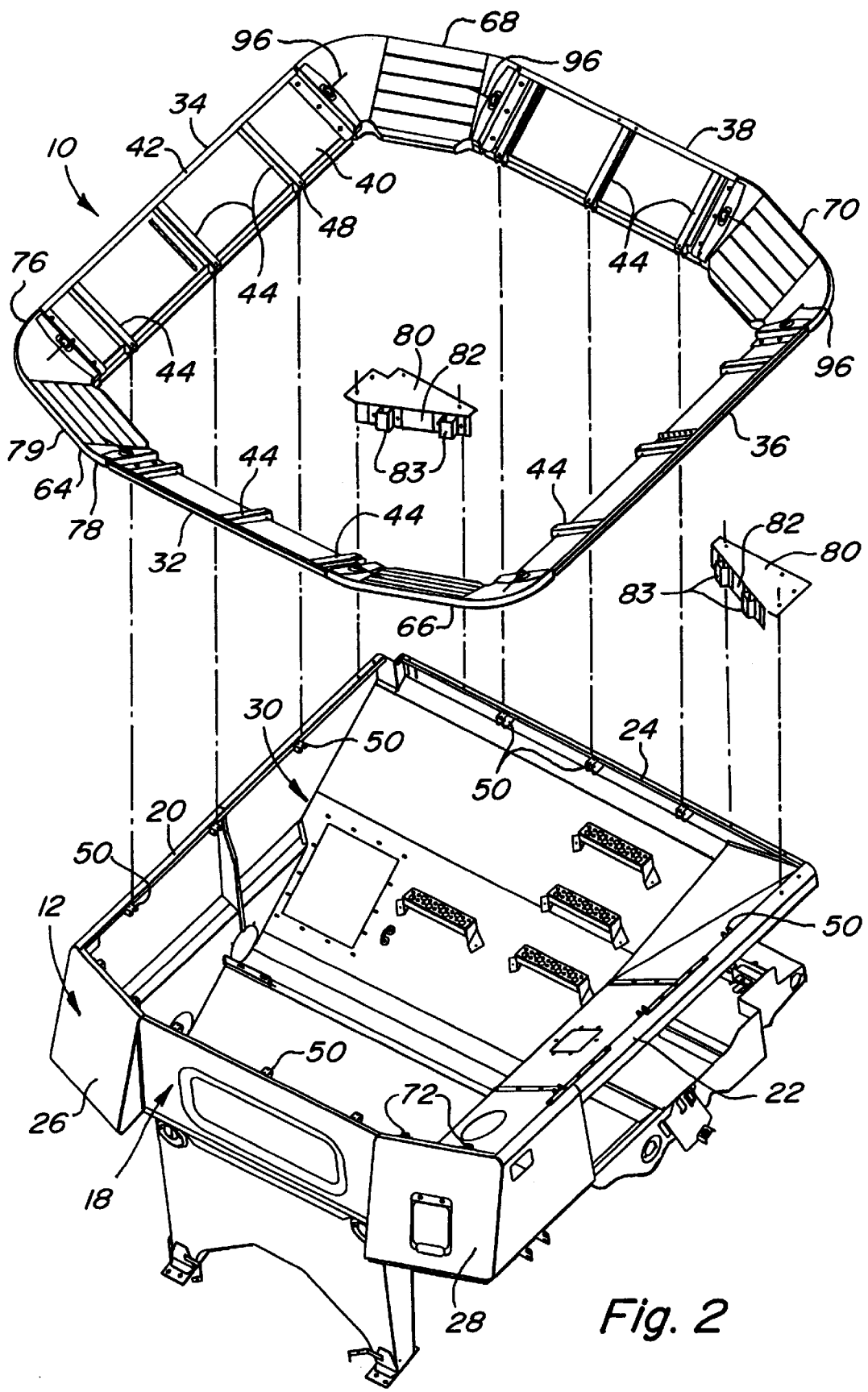
FIG. 2 is an exploded perspective view of the grain tank and the extension shown in FIG. 1.

The grain tank extension of the present invention is shown in FIG. 1 and designated generally at 10. The extension 10 is mounted to the grain tank 12 of an agricultural combine 14. With reference to FIG. 2, the grain tank 12 has a plurality of walls, including a front wall 18, opposite side walls 20, 22 and a rear wall 24. Corner walls 26 and 28 are located between the front wall 18 and adjacent side walls 20 and 22. The grain tank walls are assembled to form the tank with an upper opening 30.

Figure 6:
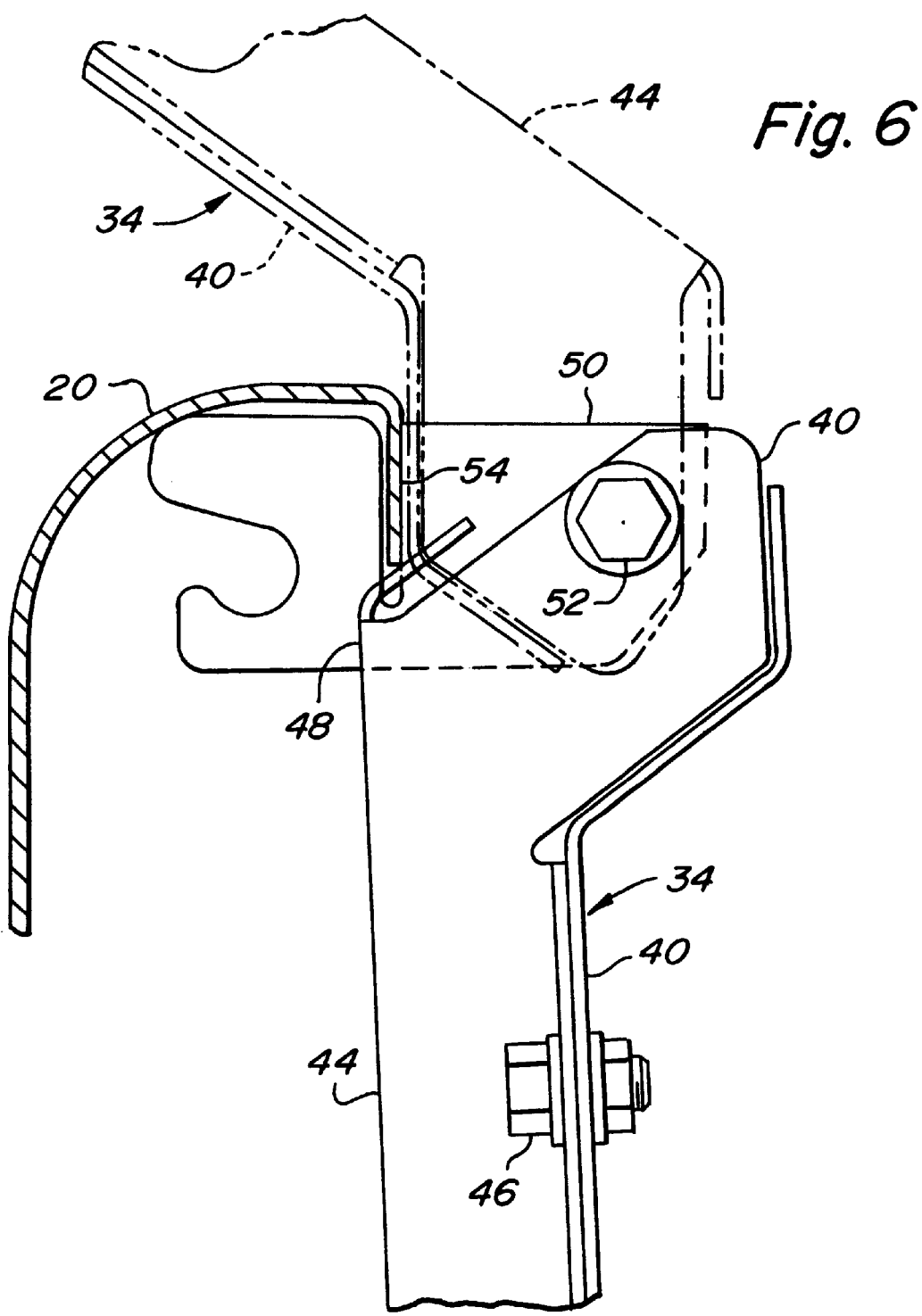
FIG. 6 is an elevational view of the side panel mounting to the grain tank showing the side panel in both a stored position extending into the grain tank and a use position extending upward from the grain tank.

The extension 10 has a plurality of straight side panels 32, 34, 36, 38 that are mounted to the tank walls 18, 20, 22, 24 respectively. The side panels are constructed of a metal sheet 40 having an in-turned flange 42 at the upper end. Hinge brackets 44 are secured to the inside of the metal sheets 40 by nut and bolt fasteners 46 (FIG. 6). The lower ends 48 of the hinge brackets are pivotally attached to mounting brackets 50 (FIGS. 2 and 6) at the upper opening of the grain tank by pivot pins 52. In FIG. 6, the side panel 34 is shown in solid line in a stored position extending downward into the grain tank 12. The use position of the side panel is shown in phantom line in which the side panel extends upwardly and outwardly from the upper opening 30 of the grain tank. In the use position, the side panel bears against a down-turned flange 54 at the upper opening of the grain tank.

Figure 7:
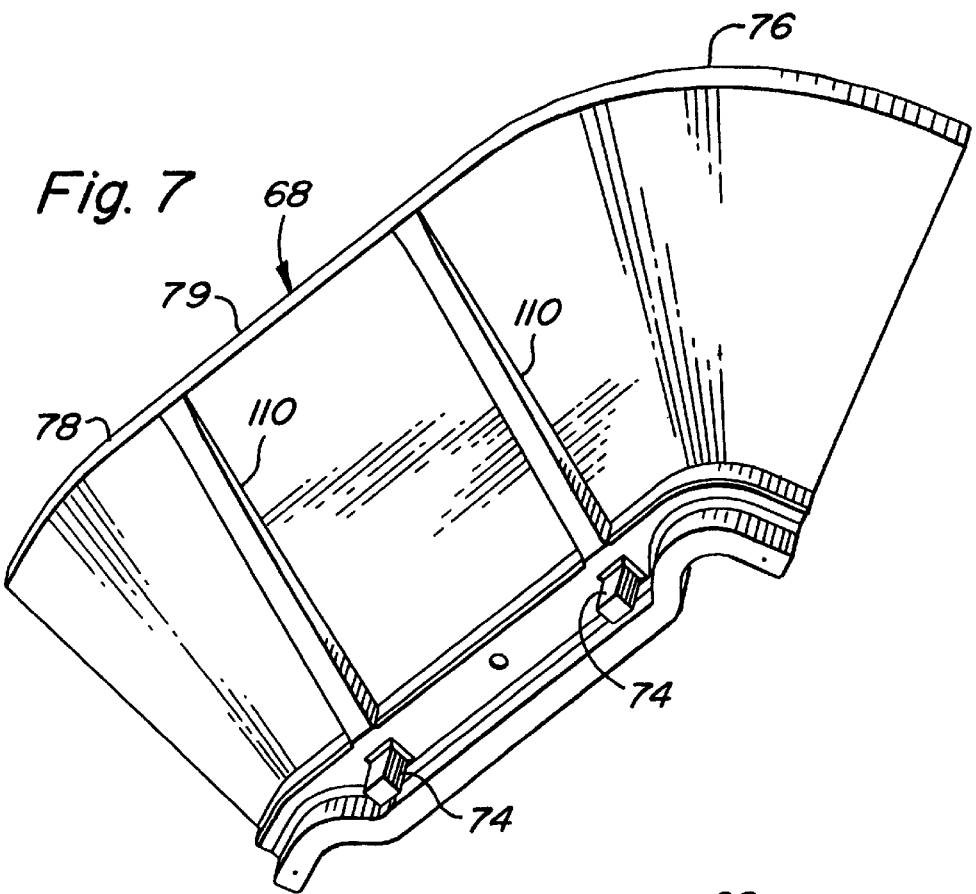
FIG. 7 is a perspective view of the exterior of a corner panel of the extension of the present invention.
Figure 8:
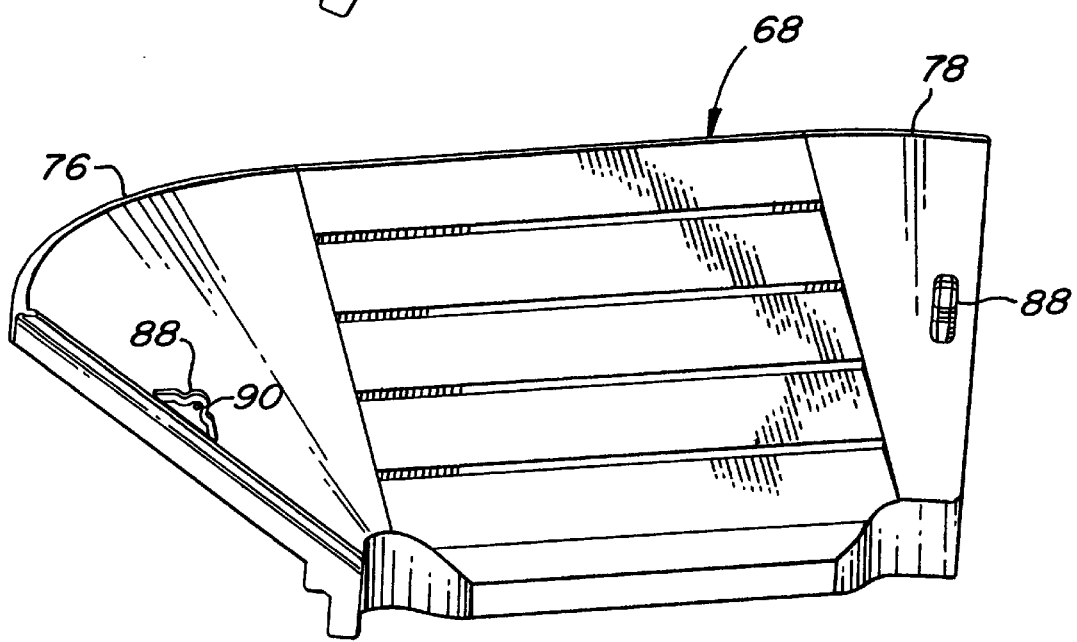
FIG. 8 is a perspective view of the interior of a corner panel of the extension of the present invention.

Corner panels 64, 66, 68, 70 are disposed between adjacent side panels. The corner panels 64 and 66 sit atop the corner walls 26, 28 of the grain tank, between the front wall 18 and side walls 20, 22. Hat-shaped metal brackets 72 attached to the tank walls 26, 28 form pockets for mounting the corner panels 64, 66 thereto. The corner panels are single piece molded plastic panels. The panels include downwardly projecting posts 74 as shown in FIG. 7. The posts 74 are inserted into the pockets formed by the brackets 72 to mount the panels 64, 66 to the grain tank and support the outward load of the grain on the corner panels.

The two corner panels 64, 66 are mirror images of one another and each include two curved transition or bend portions 76 and 78 with a straight portion 79 therebetween.

The transition portions can be curved with a large radius as shown or formed as a sharp corner. Corner panel 64 is identical to the diagonally opposite corner panel 70 and the corner panel 66 is identical to the diagonally opposite corner panel 68.

Horizontal corner plates 80 are mounted to the grain tank at the two rear corners since the rear wall 24 of the grain tank directly connects to the grain tank side walls 20 and 22. The corner plates 80 follow the contour of the extension formed by the corner panels 68, 70. The corner plates 80 include an inner down-turned flange 82 with hat-shaped brackets 83 attached thereto, forming pockets for receiving the posts 74 of the corner panels. The corner plates 80 close the grain tank upper opening at the rear corners to prevent grain loss from between the tank and the extension.

Figure 3:
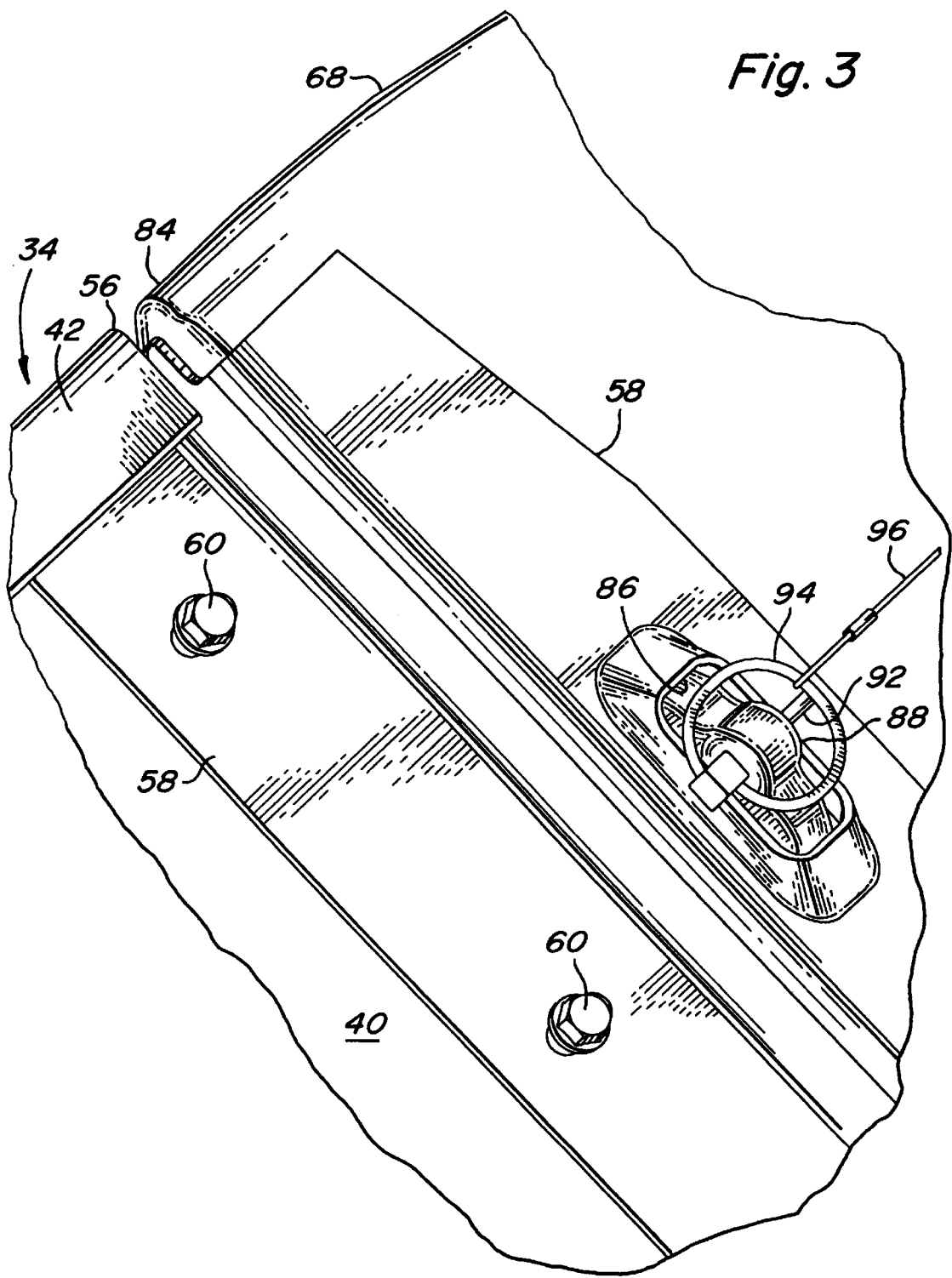
FIG. 3 is an enlarged perspective view of the coupling between the side and end panels of the grain tank extension of the present invention.

With reference once again to FIG. 3, the ends 56 of the side panels each include a sheet metal flange 58 fastened to the metal sheet 40 by bolts 60. Each flange 58 extends from the end of the side panel and overlaps the end 84 of the adjacent corner panel. The flange 58 is formed with an aperture 86. A stud 88 projects from the corner panel, adjacent the end 84. The stud 88 extends through the aperture 86 in the flange 58 of the side panel. The stud 88 has a cross bore 90 that receives a retaining pin 92 to hold the stud 88 in the aperture 86 of the flange. The pin 92 is preferably a quick lock pin having a ring 94. A tether 96 is fastened to the ring 94 and to the body of the corner panel to keep the pin with the corner panel when the extension is stored in the grain tank.

The overlapping of the flange 58 over the end of the corner panel resists leakage of grain from between the side and corner panels. In addition, the flange 58 is formed with a groove 100 along the side panel end. The corner panel in turn is molded with a rib 102 along the end that seats within the groove 100. This forms a circuitous path between the side and end panels to further resist leakage of grain between the side and end panels.

Figure 4:
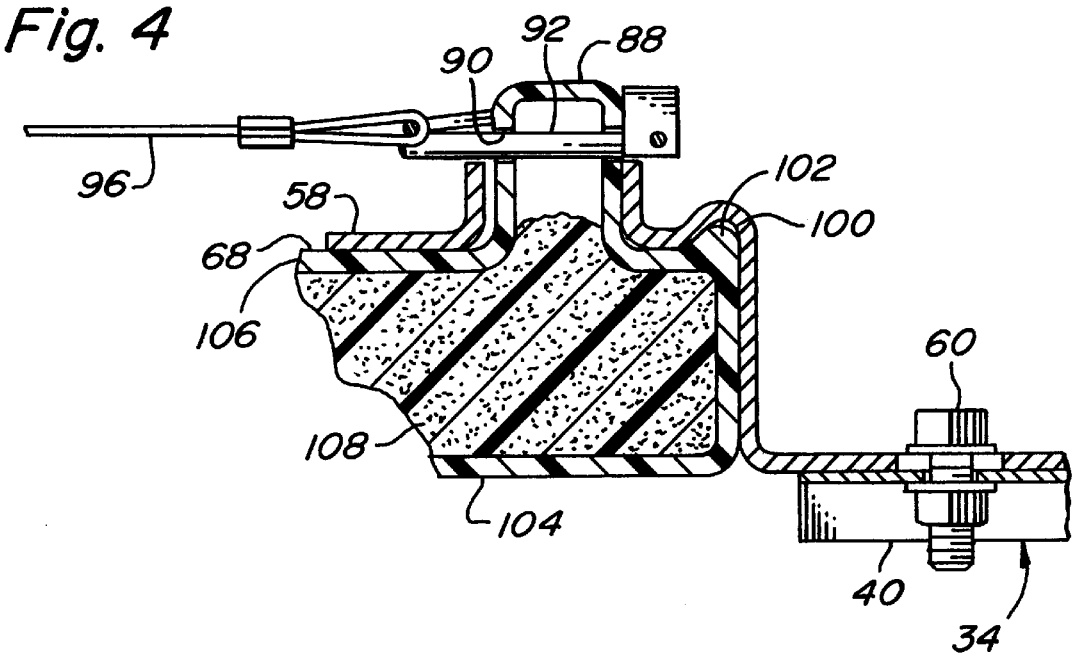
FIG. 4 is a sectional view through the coupling of the side and end panels.
Figure 5:
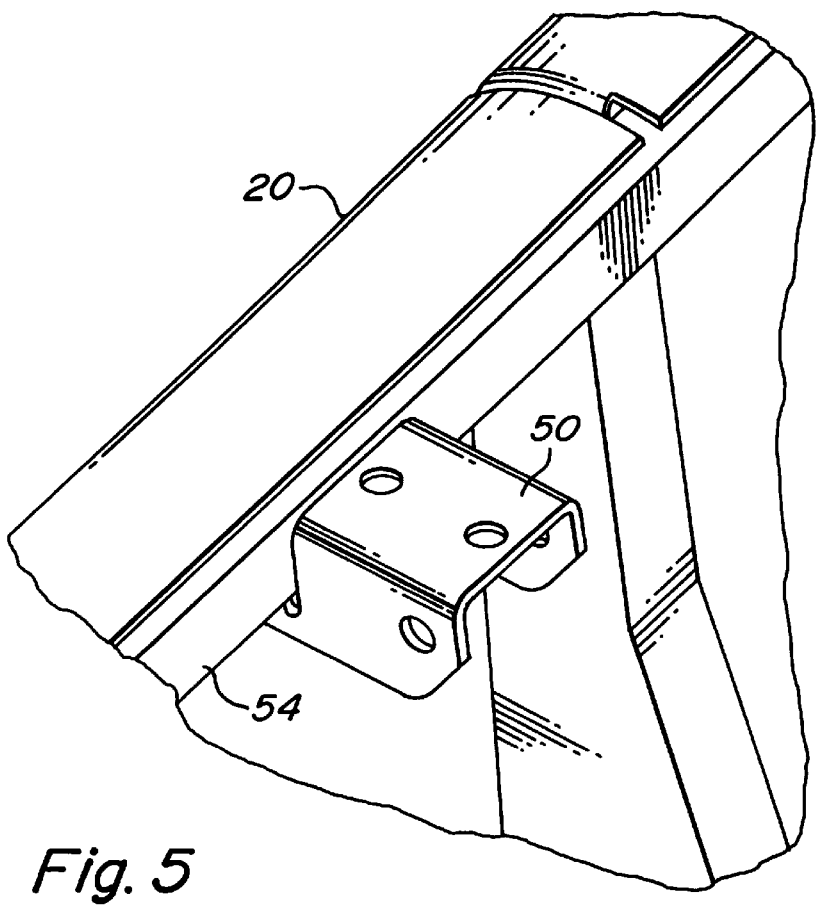
FIG. 5 is a perspective view of a mounting bracket for attachment of the side panels to the grain tank.

As shown in FIG. 4, the corner panel is a plastic molded panel with spaced double walls 104 and 106, forming a hollow interior. The hollow interior may be filled with rigid foam 108 to add strength to the corner panel or the panel interior may remain hollow. Each corner panel is further formed with ribs 110 along the outside of the panel, extending upward from the posts 74. This provides added strength to the corner panel.

To lower the extension, the eight pins 92 are removed from the cross bores in the corner panel studs. The side panels 32, 34, 36, 38 are rotated inward and downward into the grain tank, as shown in FIG. 6. The four corner panels 64, 66, 68, 70 are lifted out of the pockets at the corners of the grain tank and placed in the grain tank for storage. One benefit of molding the corner panel of plastic is that they will not damage the painted surfaces of the grain tank when stored therein. It is an advantage of the extension of the present invention that only eight quick lock pin fasteners need to be removed to lower the extension. As a result, it is relatively easy to convert the extension from the use position to the stored position within the grain tank. The operator no longer has to remove multiple nut and bolt fasteners from the extension, or keep the fasteners in a secure location during storage.

It is preferred to make the corner panels as a single piece, molded plastic body with the studs 88 at each end integrally formed therein. However, it is possible to construct an extension having the stud and pin coupling without integrally molding the corner panel with the stud. The stud may be metal stud assembled to the corner panel in a secondary operation. It is also possible to provide the overlapping flanges on the corner panels and the projecting studs on the side panels. Accordingly, the invention should not be limited to the above-described embodiment, but should be limited solely by the claims that follow.

We claim:

1. An extension on a combine grain tank, the grain tank having walls that terminate at upper ends forming a tank having an upper opening, the extension comprising:

substantially straight side panels coupled to the tank at the upper opening, each side panel being rotatably mounted to the tank for rotation between a use position projecting upward from the upper opening and a stored position extending downward from the upper opening into the tank, each side panel having opposite ends;

corner panels having use positions projecting upward from the upper opening of the tank between the ends of adjacent side panels, the corner panels each having opposite ends and the corner panels being removable from the upper opening of the tank for storage of the corner panels within the tank;

a flange extending from the end of one of adjacent side and corner panels and overlapping an abutting end of the other of the adjacent side and corner panels, the flange having an aperture therethrough;

a stud projecting from the other of the adjacent side and corner panels for extension through the aperture in the flange; and a removable retaining pin extending through the stud to retain the stud in the flange aperture thereby coupling the side panel to the adjacent corner panel whereby the side panel can be uncoupled from the corner panel by removal of the retaining pin from the stud.

2. The extension as defined by claim 1 wherein the corner panels are molded plastic resin panels.

3. The extension as defined by claim 2 wherein the stud projects from the corner panel and the corner panel and the stud are integrally molded as a single piece plastic body.

4. The extension as defined by claim 2 wherein the corner panels have spaced walls defining a hollow interior.

5. The extension as defined by claim 4 wherein the hollow interior of the corner panels is filled with foam.

6. The extension as defined by claim 1 further comprising a tether to couple the retaining pin to one of the side and corner panels.

7. The extension as defined by claim 1 wherein the corner panels have a pair of downward extending posts insertable into pockets at the upper opening of the tank to mount the corner panels on the tank at the upper opening.

8. The extension as defined by claim 1 further comprising a raised rib projecting from the inner surface of the corner panels along the ends thereof and a complementary groove in the flange extending from the side panels for seating of the rib in the groove thereby forming a circuitous path between the corner and side panels to resist grain leakage between the corner and side panels.

9. The extension as defined by claim 1 wherein diagonally opposite corner panels are identical to one another.

10. An extension on a combine grain tank, the grain tank having walls that terminate at upper ends forming a tank having an upper opening, the extension comprising:

substantially straight side panels coupled to the tank at the upper opening, each side panel being rotatably mounted to the tank for rotation between a use position projecting upward from the upper opening and a stored position extending downward from the upper opening into the tank, each side panel having opposite ends;

corner panels having use positions projecting upward from the upper opening of the tank between the ends of adjacent side panels, the corner panels each having opposite ends and the corner panels being removable from the upper opening of the tank for storage of the corner panels within the tank;

a flange extending from the ends of the side panels and overlapping an abutting end of the adjacent corner panels, the flange having an aperture therethrough;

a stud projecting from the corner panels adjacent the ends thereof for extension through the aperture in the flange; and a removable retaining pin extending through the stud to retain the stud in the flange aperture thereby coupling the side panel to the adjacent corner panel whereby the side panel can be uncoupled from the corner panel by removal of the retaining pin from the stud.

11. The extension as defined by claim 10 wherein the corner panels are molded plastic resin panels integrally molded with the studs as a single piece.

12. The extension as defined by claim 10 further comprising a raised rib projecting from the inner surface of the corner panels along the ends thereof and a complementary groove in the flange extending from the side panels for reception of the rib therein forming a circuitous path between the corner and side panels to resist grain leakage between the corner and side panels.

\* \* \* \* \*